US00RE36478E

United States Patent [19]

McAulay et al.

[11] E Patent Number: Re. 36,478

[45] Reissued Date of Patent: Dec. 28, 1999

[54] PROCESSING OF ACOUSTIC WAVEFORMS

[75] Inventors: Robert J. McAulay, Lexington; Thomas F. Quatieri, Jr., Arlington, both of Mass.

[73] Assignee: Massachusetts Institute of Technology, Cambridge, Mass.

[21] Appl. No.: 08/631,222

[22] Filed: Apr. 12, 1996

Related U.S. Patent Documents

Reissue of:

[64] Patent No.: 4,885,790
Issued: Dec. 5, 1989
Appl. No.: 07/339,957
Filed: Apr. 18, 1989

U.S. Applications:

[63] Continuation of application No. 06/712,866, Mar. 18, 1985, abandoned.

[51] Int. Cl.[6] ..... G10L 5/00; G10L 7/06; G10L 3/00

[52] U.S. Cl. ..... 704/206; 704/265; 704/203

[58] Field of Search ..... 395/2.14, 2.18, 395/2.29, 2.12, 2.13, 2.33, 2.34, 2.7, 2.74, 2.77, 2.78; 704/203–209, 220, 224, 225, 261, 265, 268, 269

[56] References Cited

U.S. PATENT DOCUMENTS

| | | | |
|---|---|---|---|
| 3,296,374 | 1/1967 | Clapper | 395/2.18 |
| 3,360,610 | 12/1967 | Flanagan | 395/2.12 |
| 3,484,556 | 12/1969 | Flanagan et al. | 395/2.29 |
| 3,978,287 | 8/1976 | Fletcher et al. | 395/2.4 |
| 3,982,070 | 9/1976 | Flanagan | 395/2.74 |
| 4,034,160 | 7/1977 | Van Gerwen | 395/2.1 |
| 4,058,676 | 11/1977 | Wilkes et al. | 395/2.29 |
| 4,076,958 | 2/1978 | Fulghum | 395/2.77 |
| 4,435,832 | 3/1984 | Asada et al. | 395/2.71 |
| 4,701,955 | 10/1987 | Taguchi | 395/2.32 |

FOREIGN PATENT DOCUMENTS

| | | |
|---|---|---|
| 57-197600 | 3/1982 | Japan . |
| 58-98800 | 6/1983 | Japan . |
| 59-42598 | 3/1984 | Japan . |

OTHER PUBLICATIONS

Malpass, "The Gold–Rabiner Pitch Detector In A Real Time Environment," *Proc. of Eascon* (Sep. 1975), pp. 1–7.

Gold, "Description of a Computer Program for Pitch Detection," *Fourth International Congress,* Copenhagen, Aug. 21–18, 1962.

Gold, "Note On Buzz–Hiss Detection," *J. Acoust. Soc. Am,* vol. 36, No. 9, 1964, pp. 1659–1661.

Holmes, "The JSRU Channel Vocoder," *IEE Proc.,* vol. 127, No. 1, 1980, pp. 53–60.

Rabiner & Schafer, *Digital Processing of Signals,* Prentice Hall, 1978, pp. 225–238.

(List continued on next page.)

*Primary Examiner*—David D. Knepper
*Attorney, Agent, or Firm*—Hamilton, Brook, Smith & Reynolds, P.C.

[57] ABSTRACT

A sinusoidal model for acoustic waveforms is applied to develop a new analysis/synthesis technique which characterizes a waveform by the amplitudes, frequencies, and phases of component sine waves. These parameters are estimated from a short-time Fourier transform. Rapid changes in the highly-resolved spectral components are tracked using the concept of "birth" and "death" of the underlying sine waves. The component values are interpolated from one frame to the next to yield a representation that is applied to a sine wave generator. The resulting synthetic waveform preserves the general waveform shape and is perceptually indistinguishable from the original. Furthermore, in the presence of noise the perceptual characteristics of the waveform as well as the noise are maintained. The method and devices are particularly useful in speech coding, time-scale modification, frequency scale modification and pitch modification.

96 Claims, 10 Drawing Sheets

OTHER PUBLICATIONS

Markell, *Linear Prediction of Speech,* Springer–Verlog, 1967, pp. 227–262.

Almeida et al., "Variable–Frequency Synthesis: An Improved Harmonic Coding Scheme," *IEEE,* vol. 2, 1984, pp. 27.5.1–27.5.4.

Crochiere, "A Weighted Overlap–Add Method of Short–time Fourier Analysis/Synthesis," *IEEE Trans. on Acoustics, Speech & Sig. Proc.,* vol. ASSP–28, 1980, pp. 99–102.

Silverman et al., "Transfer Characteristic Estimation for Speech Via Multirate Evaluation," *IEEE,* pub. 75 CHO 998–5 Eascon, 1975, pp. 181–A to 181–G (7 pages).

"A Tone–Oriented Voice–Excited Vocoder," Hedelin; Chalmers University of Technology, Gothenburg, Sweden, CH1610/5/81, pp. 205–208, *IEEE,* 1981.

"A Representation of Speech With Partials," Hedelin; 1982 Elmevier Biological Press, The Representation of Speech in the Peripheral Auditory System, R. Carlson & B. Granstrom, pp. 247–250.

Almeida, Luis B. et al., "Harmonic Coding: A Low Bit–Rate, Good Quality Speech Coding Technique," IEEE, 1982, pp. 1664–1667.

Griffin, Daniel W. et al., "A New Model–Based Speech Analysis/Synthesis System," IEEE International Conference on Acoustics, Speech, and Signal Processing, Mar. 26–29, 1985, pp. 513–516.

Griffin, Daniel W. et al., "A New Pitch Detection Algorithm," Proc. of Int. Conf. on Digital Signal Processing, Florence, Italy, Sep. 1984, pp. 395–399.

STEP 3:

PROCESSING OF ACOUSTIC WAVEFORMS

Matter enclosed in heavy brackets [ ] appears in the original patent but forms no part of this reissue specification; matter printed in italics indicates the additions made by reissue.

*This a Reissue of Ser. No. 07/339,957, filed Apr. 18, 1989, now U.S Pat. No. 4,885,790, Dec. 5, 1989 which is a continuation of Ser. No. 06/712,866, filed Mar. 18, 1985, abandoned.*

The U.S. Government has rights in this invention pursuant to the Department of the Air Force Contract No. F19-028-80-C-0002.

TECHNICAL FIELD

The field of this invention is speech technology generally and, in particular, methods and devices for analyzing, digitally-encoding, modifying and synthesizing speech or other acoustic waveforms.

BACKGROUND OF THE INVENTION

Typically, the problem of representing speech signals is approached by using a speech production model in which speech is viewed as the result of passing a glottal excitation waveform through a time-varying linear filter that models the resonant characteristics of the vocal tract. In many speech applications it suffices to assume that the glottal excitation can be in one of two possible states corresponding to voiced or unvoiced speech. In the voiced speech state the excitation is periodic with a period which is allowed to vary slowly over time relative to the analysis frame rate (typically 10–20 msecs). For the unvoiced speech state the glottal excitation is modelled as random noise with a flat spectrum. In both cases the power level in the excitation is also considered to be slowly time-varying.

While this binary model has been used successfully to design narrowband vocoders and speech synthesis systems, its limitations are well known. For example, often the excitation is mixed having both voiced and unvoiced components simultaneously, and often only portions of the spectrum are truly harmonic. Furthermore, the binary model requires that each frame of data be classified as either voiced or unvoiced, a decision which is particularly difficult to make if the speech is also subject to additive acoustic noise.

Speech coders at rates compatible with conventional transmission lines (i.e. 2.4–9.6 kilobits per second) would meet a substantial need. At such rates the binary model is ill-suited for coding applications. Additionally, speech processing devices and methods that allow the user to modify various parameters in reconstructing waveform would find substantial usage. For example, time-scale modification (without pitch alteration) would be a very useful feature for a variety of speech applications (i.e. slowing down speech for translation purposes or speeding it up for scanning purposes) as well as for musical composition or analysis. Unfortunately, time-scale (and other parameter) modifications also are not accomplished with high quality by devices employing the binary model.

Thus, there exists a need for better methods and devices for processing audible waveforms. In particular, speech coders operable to mid-band rates and in noisy environments as well as synthesizers capable of maintaining their perceptual quality of speech while changing the rate of articulation would satisfy long-felt needs and provide substantial contributions to the art.

SUMMARY OF THE INVENTION

It has been discovered that speech analysis and synthesis as well as coding and time-scale modification can be accomplished simply and effectively by employing a time-frequency representation of the speech waveform which is independent of the speech state. Specifically, a sinusoidal model for the speech waveform is used to develop a new analysis-synthesis technique.

The basic method of the invention includes the steps of: (a) selecting frames (i.e. windows of about 20–40 milliseconds) of samples from the waveform; (b) analyzing each frame of samples to extract a set of frequency components; (c) tracking the components from one frame to the next; and (d) interpolating the values of the components from one frame to the next to obtain a parametric representation of the waveform. A synthetic waveform can then be constructed by generating a series of sine waves corresponding to the parametric representation.

In one simple embodiment of the invention, a device is disclosed which uses only the amplitudes and frequencies of the component sine waves to represent the waveform. In this so-called "magnitude-only" system, phase continuity is maintained by defining the phase to be the integral of the instantaneous frequency. In a more comprehensive embodiment, explicit use is made of the measured phases as well as the amplitudes and frequencies of the components.

The invention is particularly useful in speech coding and time-scale modification and has been demonstrated successfully in both of these applications. Robust devices can be built according to the invention to operate in environments of additive acoustic noise. The invention also can be used to analyze single and multiple speaker signals, music or even biological sounds. The invention will also find particular applications, for example, in reading machines for the blind, in broadcast journalism editing and in transmission of music to remote players.

In one illustrated embodiment of the invention, the basic method summarized above is employed to choose amplitudes, frequencies, and phases corresponding to the largest peaks in a periodogram of the measured signal, independently of the speech state. In order to reconstruct the speech waveform, the amplitudes, frequencies, and phases of the sine waves estimated on one frame are matched and allowed to continuously evolve into the corresponding parameter set on the successive frame. Because the number of estimated peaks are not constant and slowly varying, the matching process is not straightforward. Rapidly varying regions of speech such as unvoiced/voiced transitions can result in large changes in both the location and number of peaks. To account for such rapid movements in spectral energy, the concept of "birth" and "death" of sinusoidal components is employed in a nearest-neighbor matching method based on the frequencies estimated on each frame. If a new peak appears, a "birth" is said to occur and a new track is initiated. If an old peak is not matched, a "death" said to occur and the corresponding track is allowed to decay to zero. Once the parameters on successive frames have been matched, phase continuity of each sinusoidal component is ensured by unwrapping the phase. In one preferred embodiment the phase is unwrapped using a cubic phase interpolation function having parameter values that are chosen to satisfy the measured phase and frequency constraints at the frame boundaries while maintaining maximal smoothness over the frame duration. Finally, the corresponding sinusoidal amplitudes are simply interpolated in a linear manner across each frame.

In speech coding applications, pitch estimates are used to establish a set of harmonic frequency bins to which the frequency components are assigned. (Pitch is used herein to mean the fundamental rate at which a speaker's vocal cords are vibrating). The amplitudes of the components can be coded directly using adaptive pulse code modulation (ADPCM) across frequency or indirectly using linear predictive coding. In each harmonic frequency bin the peak having the largest amplitude is selected and assigned to the frequency at the center of the bin. This results in a harmonic series based upon the coded pitch period. The phases can then be coded by using the frequencies to predict phase at the end of the frame, unwrapping the measured phase with respect to this prediction and then coding the phase residual using 4 bits per phase peak. If there are not enough bits available to code all of the phase peaks (e.g. for low-pitch speakers), phase tracks for the high frequency peaks can be artificially generated. In one preferred embodiment, this is done by translating the frequency tracks of the base band peaks to the high frequency of the uncoded phase peaks. This new coding scheme has the important property of adaptively allocating the bits for each speaker and hence is self-tuning to both low- and high-pitched speakers. Although pitch is used to provide side information for the coding algorithm, the standard voice-excitation model for speech is not used. This means that recourse is never made to a voiced-unvoiced decision. As a consequence the invention is robust in noise and can be applied at various data transmission rates simply by changing the rules for the bit allocation.

The invention is also well-suited for time-scale modification, which is accomplished by time-scaling the amplitudes and phases such that the frequency variations are preserved. The time-scale at which the speech is played back is controlled simply by changing the rate at which the matched peaks are interpolated. This means that the time-scale can be speeded up or slowed down by any factor and this factor can be time-varying. This rate can be controlled by a panel knob which allows an operator complete flexibility for varying the time-scale. There is no perceptual delay in performing the time-scaling.

The invention will next be described in connection with certain illustrated embodiments. However, it should be clear that various changes and modifications can be made by those skilled in the art without departing from the spirit and scope of the invention. For example other sampling techniques can be substituted for the use of a variable frame length and Hamming window. Moreover the length of such frames and windows can vary in response to the particular application. Likewise, frequency matching can be accomplished by various means. A variety of commercial devices are available to perform Fourier analysis; such analysis can also be performed by custom hardware or specially-designed programs.

Various techniques for extracting pitch information can be employed. For example, the pitch period can be derived from the Fourier transform. Other techniques such as the Gold-Malpass techniques can also be used. See generally, M. L. Malpass, "The Gold Pitch Detector in a Real Time Environment" Proc. of EASCON 1975 (September 1975); B. Gold, "Description of a Computer Program for Pitch Detection", Fourth International Congress on Acoustics, Copenhagen Aug. 21–28, 1962 and B. Gold, "Note on Buzz-Hiss Detection", J. Acoust. Soc. Amer. 365, 1659–1661 (1964), all incorporated herein by reference.

Various coding techniques can also be used interchangeably with those described below. Channel encoding techniques are described in J. N. Holmes, "The JSRU Channel Vocoder", Inst. of Electrical Eng. Proceedings (British), 27, 53–60 (1980). Adaptive pulse code modulation is described in L. R. Rabiner and R. W. Schafer Digital Processing of Signal, (Prentice Hall 1978). Linear predictive coding is described by J. D. Markel, Linear Prediction of Speech, (Springer-Verlog, 1967). These teachings are also incorporated by reference.

It should be appreciated that the term "interpolation" is used broadly in this application to encompass various techniques for filling in data values between those measured at the frame boundaries. In the magnitude-only system linear interpolation is employed to fill in amplitude and frequency values. In this simple system phase values are obtained by first defining a series of instantaneous frequency values by interpolating matched frequency components from one frame to the next and then integrating the series of instantaneous frequency values to obtain a series of interpolated phase values. In the more comprehensive system the phase value of each frame is derived directly and a cubic polynomial equation preferably is employed to obtain maximally smooth phase interpolations from frame to frame.

Other techniques that accomplish the same purpose are also referred to in this application as interpolation techniques. For example, the so-called "overlap and add" method of filling in data values can also be used. In this method a weighted overlapping function can be applied to the resulting sine waves generated during each frame and then the overlapped values can be summed to fill in the values between those measured at the frame boundaries.

DETAILED DESCRIPTION

In present invention the speech waveform is modelled as a sum of sine waves. If s(n) represents the sampled speech waveform then $$s(n)=\Sigma a_i(n)\sin[\phi_i(n)] \quad (1)$$

where $a_i(n)$ and $\phi_i(n)$ are time-varying amplitudes and phases of the i'th tone.

In a simple embodiment the phase can be defined to be the integral of the instantaneous frequency $f_i(n)$ and therefore satisfies the recursion $$\phi_i(n)=\phi_i(n-1)+2\pi f_i(n)/f_s \tag{2}$$

where $f_s$ is the sampling frequency. If the tones are harmonically related, then $$f_i(n)=i*f_O(n) \tag{3}$$

where $f_O(n)$ represents the fundamental frequency at time n. One particularly attractive property of the above model is the fact that phase continuity, hence waveform continuity, is guaranteed as a consequence of the definition of phase in terms of the instantaneous frequency. This means that waveform reconstruction is possible from the "magnitude-only" spectrum since a high-resolution spectral analysis reveals the amplitudes and frequencies of the component sine waves.

Figure 1:
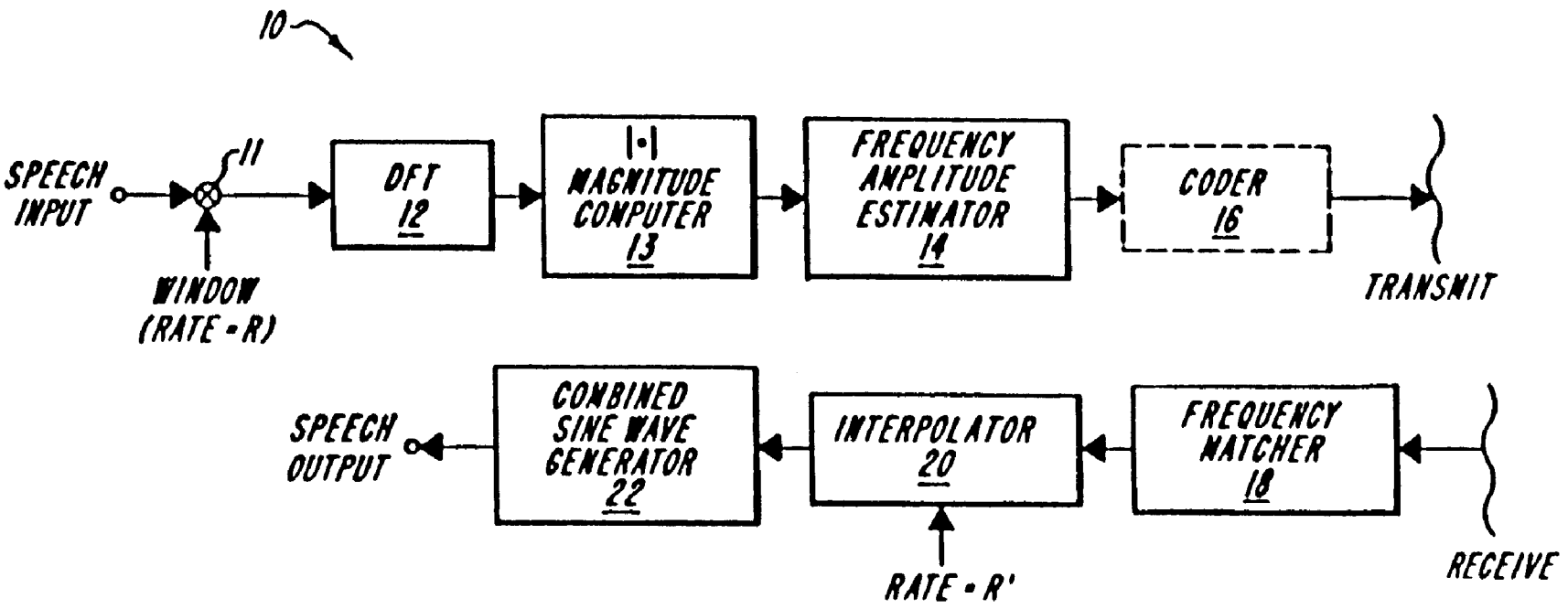
FIG. 1 is a schematic block diagram of one embodiment of the invention in which only the magnitude and frequencies of the components are used to reconstruct a sampled waveform.

A block diagram of an analysis/synthesis system according to the invention is illustrated in FIG. 1. As shown in FIG. 1, system 10 includes sampling window 11, a discrete Fourier transform (DFT) analyzer 12, magnitude computer 13, a frequency amplitude estimator 14, and an optional coder 16 in the transmitter segment and a frequency matching means 18, an interpolator 20 and a sine wave generator 22 in the receiver segment of the system. The peaks of the magnitude of the discrete Fourier transform (DFT) of a windowed waveform are found simply by determining the locations of a change in slope (concave down). In addition, the total number of peaks can be limited and this limit can be adapted to the expected average pitch of the speaker.

In a simple embodiment the speech waveform can be digitized at a 10 kHz sampling rate, low-passed filtered at 5 kHz, and analyzed at 20 msec frame intervals with a 20 msec Hamming window. Speech representations according to the invention can also be obtained by employing an analysis window of variable duration. For some applications it is preferable to have the width of the analysis window be pitch adaptive, being set, for example, at 2.5 times the average pitch period with a minimum width of 20 msec.

Figure 2:
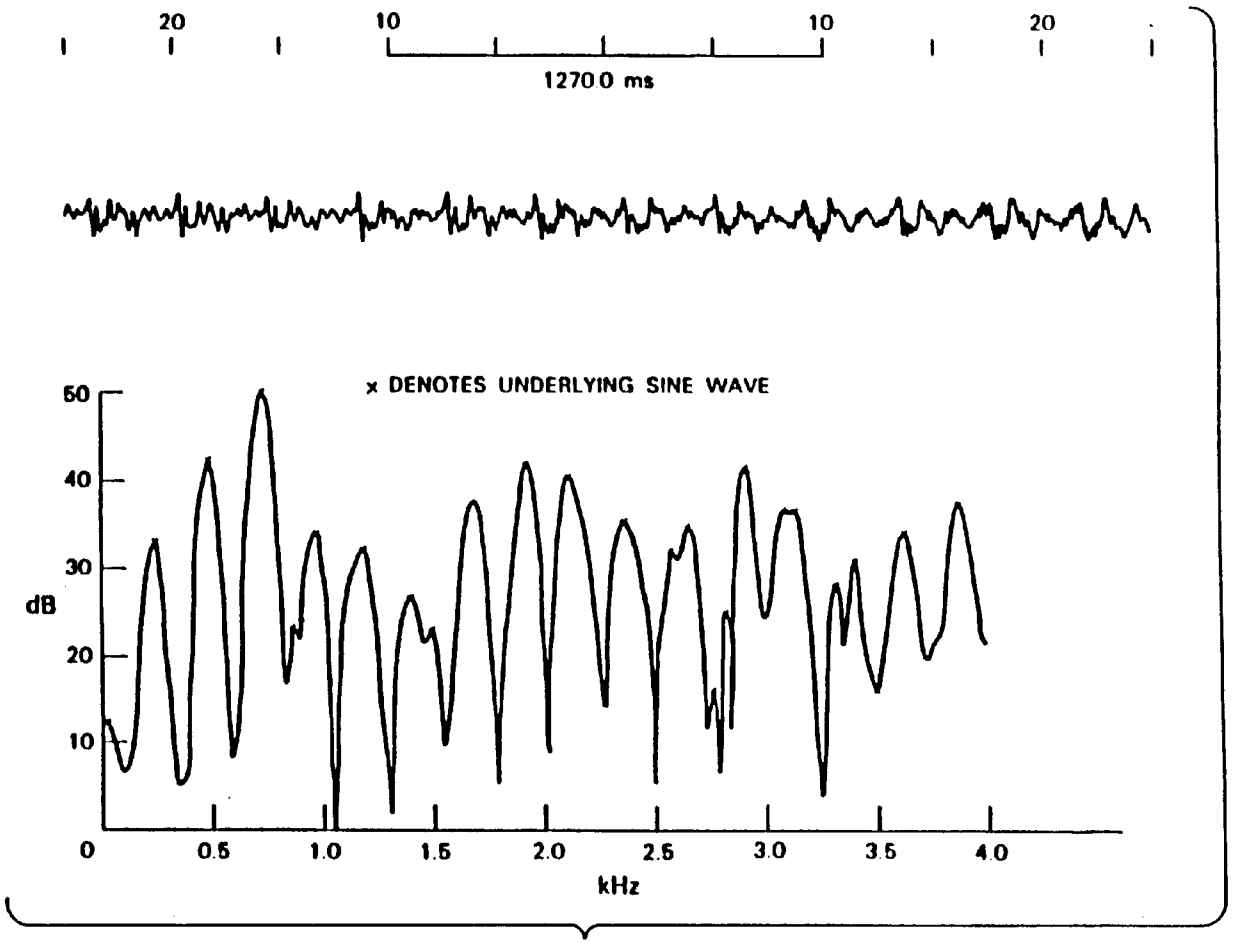
FIG. 2 is an illustration of the extracted amplitude and frequency components of a waveform sampled according to the present invention.

Plotted in FIG. 2 is a typical periodogram for a frame of speech along with the amplitudes and frequencies that are estimated using the above procedure. The DFT was computed using a 512-point fast Fourier transform (FFT). Different set of these parameters will be obtained for each analysis frame. To obtain a representation of the waveform over time, frequency components measured on one frame must be matched with those that are obtained on a successive frame.

Figure 3:
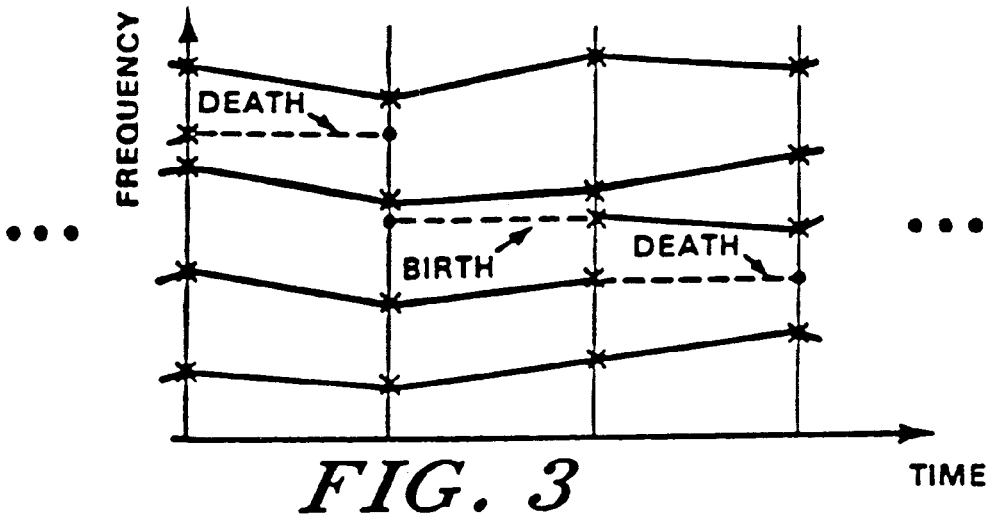
FIG. 3 is a general illustration of the frequency matching method of the present invention.

FIG. 3 illustrates the basic process of frequency component matching. If the number of peaks were constant and slowly varying from frame to frame, the problem of matching the parameters estimated on one frame with those on a successive frame would simply require a frequency ordered assignment of peaks. In practice, however, there will be spurious peaks that come and go due to the effects of sidelobe interaction; the locations of the peaks will change as the pitch changes; and there will be rapid changes in both the location and the number of peaks corresponding to rapidly-varying regions of speech, such as at voiced/unvoiced transitions. In order to account for such rapid movements in the spectral peaks, the present invention employs the concept of "birth" and "death" of sinusoidal components as part of the matching process.

The matching process is further explained by consideration of FIG. 4. Assume that peaks up to frame k have been matched and a new parameter set for frame k+1 is generated. Let the chosen frequencies on frames k and k+1 be denoted by $\omega_o^k, \omega_1^k, \ldots \omega_{N-1}^k$ and $\omega_o^{k+1}, \omega_1^{k+1}, \ldots \omega_{M-1}^{k+1}$ respectively, where N and M represent the total number of peaks selected on each frame ($N \neq M$ in general). One process of matching each frequency in frame k, $\omega_n^k$, to some frequency in frame k+1, $\omega_m^{k+1}$, is given in the following three steps.

Step 1

Figure 4A:
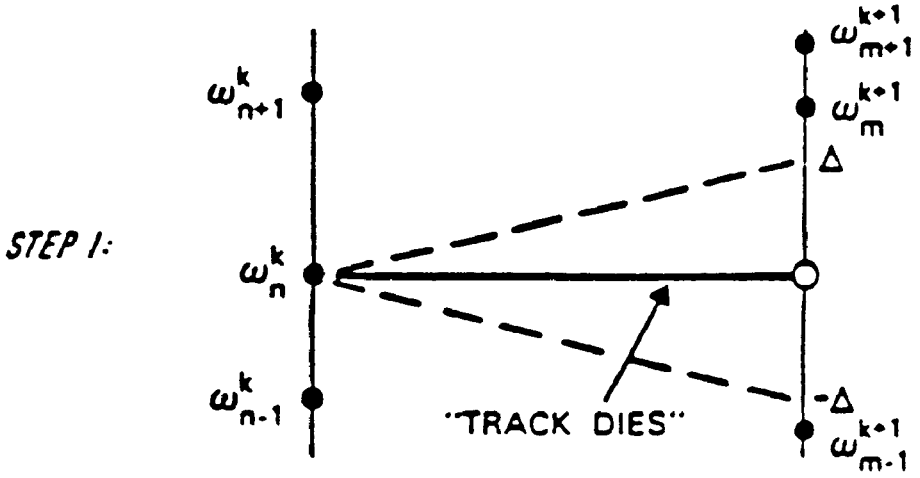
FIGS. 4A–4F are detailed schematic illustrations of a frequency matching method according to the present invention.
Figure 4B:
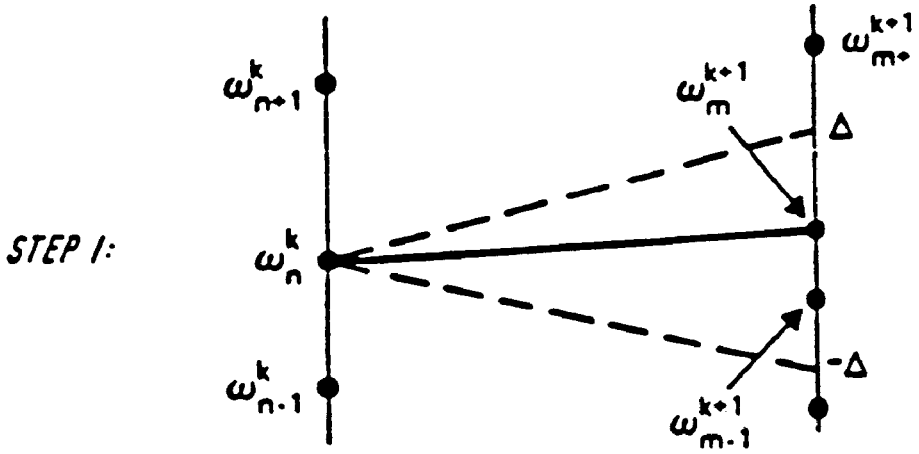

Suppose that a match has been found for frequencies $\omega_o^k$, $\omega_1^k \ldots \omega_{n-1}^k$. A match is now attempted for frequency $\omega_n^k$. FIG. 4(a) depicts the case where all frequencies $\omega_m^{k+1}$ in frame K+1 lie outside a "matching interval" $\Delta$ of $\omega_n^k$, i.e., $$|\omega_n^k-\omega_m^{k+1}|\geqq\Delta \tag{4}$$

for all m. In this case the frequency track associated with $\omega_n^k$ is declared "dead" on entering frame k+1, and $\omega_n^k$ is matched to itself in frame k+1, but with zero amplitude. Frequency $\omega_n^k$ is then eliminated from further consideration and Step 1 is repeated for the next frequency in the list, $\omega_{n+1}^k$.

If on the other hand there exists a frequency $\omega_m^{k+1}$ in frame k+1 that lies within the matching interval about $\omega_n^k$, and is the closest such frequency, i.e., $$|\omega_n^k-\omega_m^{k+1}|<|\omega_n^k-\omega_i^{k+1}|<\Delta \tag{5}$$

for all $i \neq m$, then $\omega_m^{k+1}$ is declared to be candidate match to $\omega_n^k$. A definitive match is not yet made, since there may exist a better match in frame k to the frequency $\omega_m^{k+1}$, a contingency which is accounted for in Step 2.

Step 2

Figure 4C:
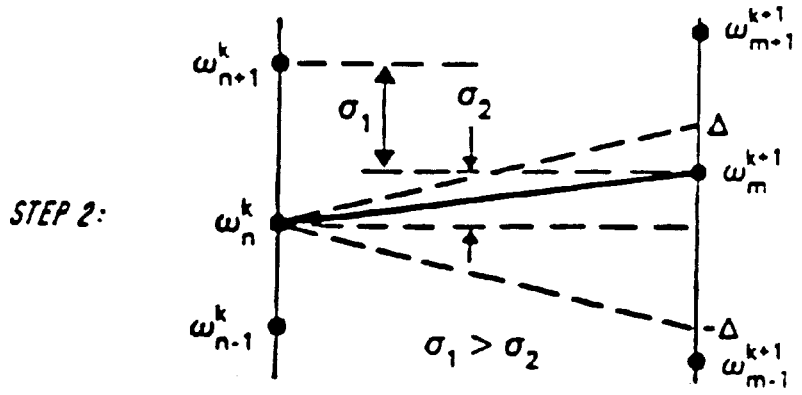
Figure 4D:
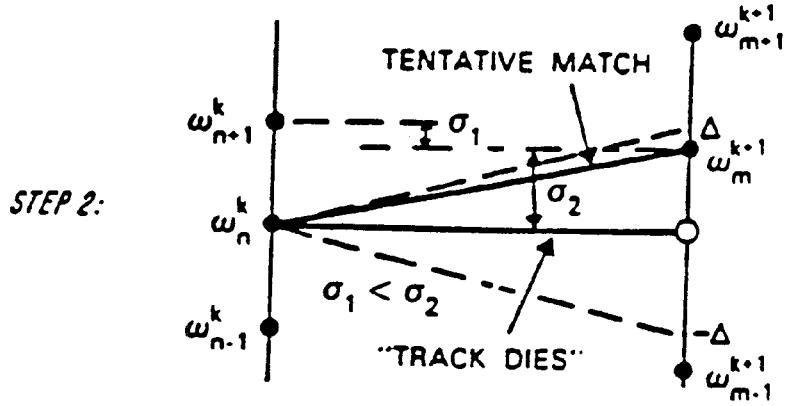
Figure 4E:
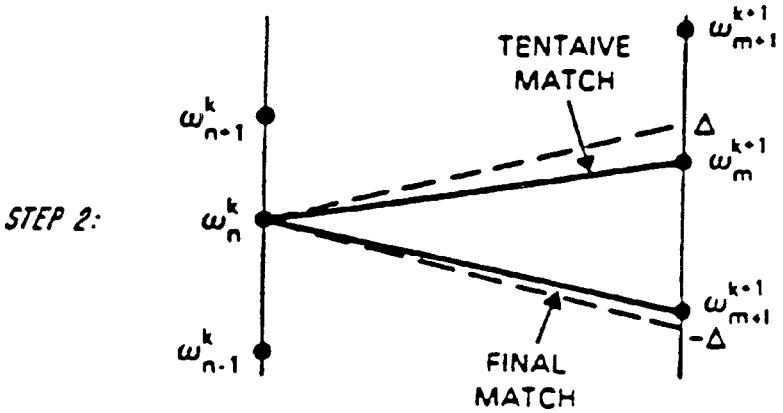

In this step, a candidate match from Step 1 is confirmed. Suppose that a frequency $\omega^k_n$ of frame k has been tentatively matched to frequency $\omega_m^{k+1}$ of frame k+1. Then, if $\omega_m^{k+1}$ has no better to the remaining unmatched frequencies of frame k, then the candidate match is declared to be a definitive match. This condition, illustrated in FIG. 4(c), is given by $$|\omega_m^{k+1}-\omega_n k|<|\omega_m^{k+1}-\omega_{i+1}^k|\text{for } i\geqq n \tag{6}$$

where the first bracketed value in Equation 6 is illustrated as $\sigma_2$ in FIG. 4 and the second bracketed value of Equation 6 is illustrated as $\sigma_1$. When this occurs, frequencies $\omega_n^k$ and $\omega_m^{k+1}$ are eliminated from further consideration and Step 1 is repeated for the next frequency in the list, $\omega^k_{n+1}$.

If the condition (6) is not satisfied, then the frequency $\omega_m^{k+1}$ in frame k+1 is better matched to the frequency $\omega^k_{n+1}$ in frame k than it is to the test frequency $\omega_n^k$. Two additional cases are then considered. In the first case, illustrated in FIG. 4(d), the adjacent remaining lower frequency $\omega^{k+1}_{m+1}$ (if one exists) lies below the matching interval, hence no match can be made. As a result, the frequency track associated with $\omega_n^k$ is declared "dead" on entering frame k+1, and $\omega_n^k$ is matched to itself with zero amplitude. In the second case, illustrated in FIG. 4(e), the frequency $\omega^{k+1}_{m-1}$ is within the matching interval about $\omega^k_n$ and a definitive match is made.

After either case Step 1 is repeated using the next frequency in the frame k list, $\omega_{n+1}$. It should be noted that many other situations are possible in this step, but to keep the tracker alternatives as simple as possible only the two cases are discussed.

Step 3

Figure 4F:
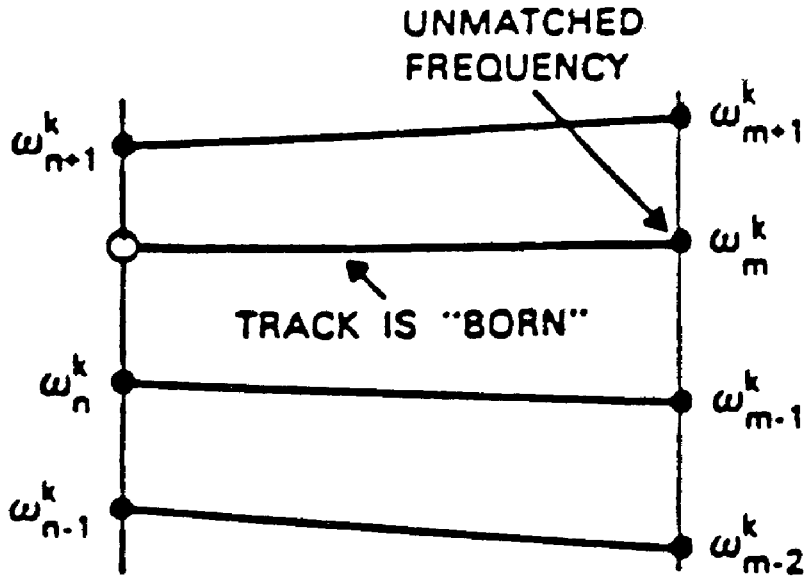

When all frequencies of frame k have been tested and assigned to continuing tracks or to dying tracks, there may remain frequencies in frame k+1 for which no matches have been made. Suppose that $\omega_m^{k+1}$ is one such frequency, then it is concluded that $\omega_m^{k+1}$ was "born" in frame k and its match, a new frequency, $\omega_m^{k+1}$, is created in frame k with zero magnitude. This is done for all such unmatched frequencies. This last step is illustrated in FIG. 4(f).

Figure 5:
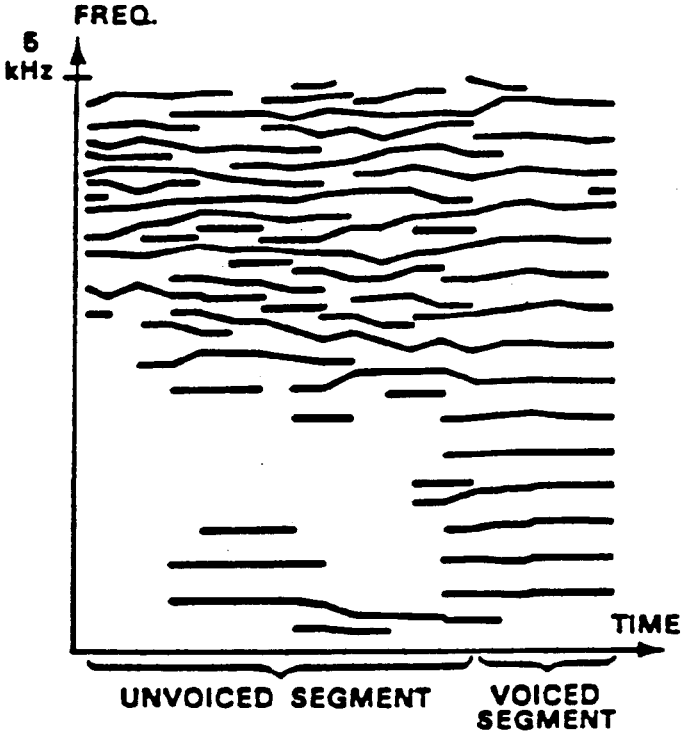
FIG. 5 is an illustration of tracked frequency components of an exemplary speech pattern.

The results of applying the tracker to a segment of real speech is shown in FIG. 5, which demonstrates the ability of the tracker to adapt quickly through transitory speech behavior such as voiced/unvoiced transitions, and mixed voiced/unvoiced regions.

In the simple "magnitude-only" system, synthesis is accomplished in a straightforward manner. Each pair of match frequencies (and their corresponding magnitudes) are linearly interpolated across consecutive frame boundaries. As noted above, in the magnitude-only system, phase continuity is guaranteed by the definition of phase in terms of the instantaneous frequency. The interpolated values are then used to drive a sine wave generator which yields the synthetic waveform as shown in FIG. 1. It should be noted that performance is improved by reducing the correlation window size, Δ, at higher frequencies.

A further feature shown in FIG. 1 (and discussed in detail below) is that the present invention is ideally suited for performing time-scale modification. From FIG. 3 it can be seen that by simply expanding or compressing the time scale, the locations and magnitudes are preserved while modifying their rate of change in time. To effect a rate of change b, the synthesizer interpolation rate R' (see FIG. 1) is given by R'=bR. Furthermore, with this system it is straightforward to invoke a time-varying rate of change since frequencies may be stretched or compressed by varying the interpolation rate in time.

Figure 6:
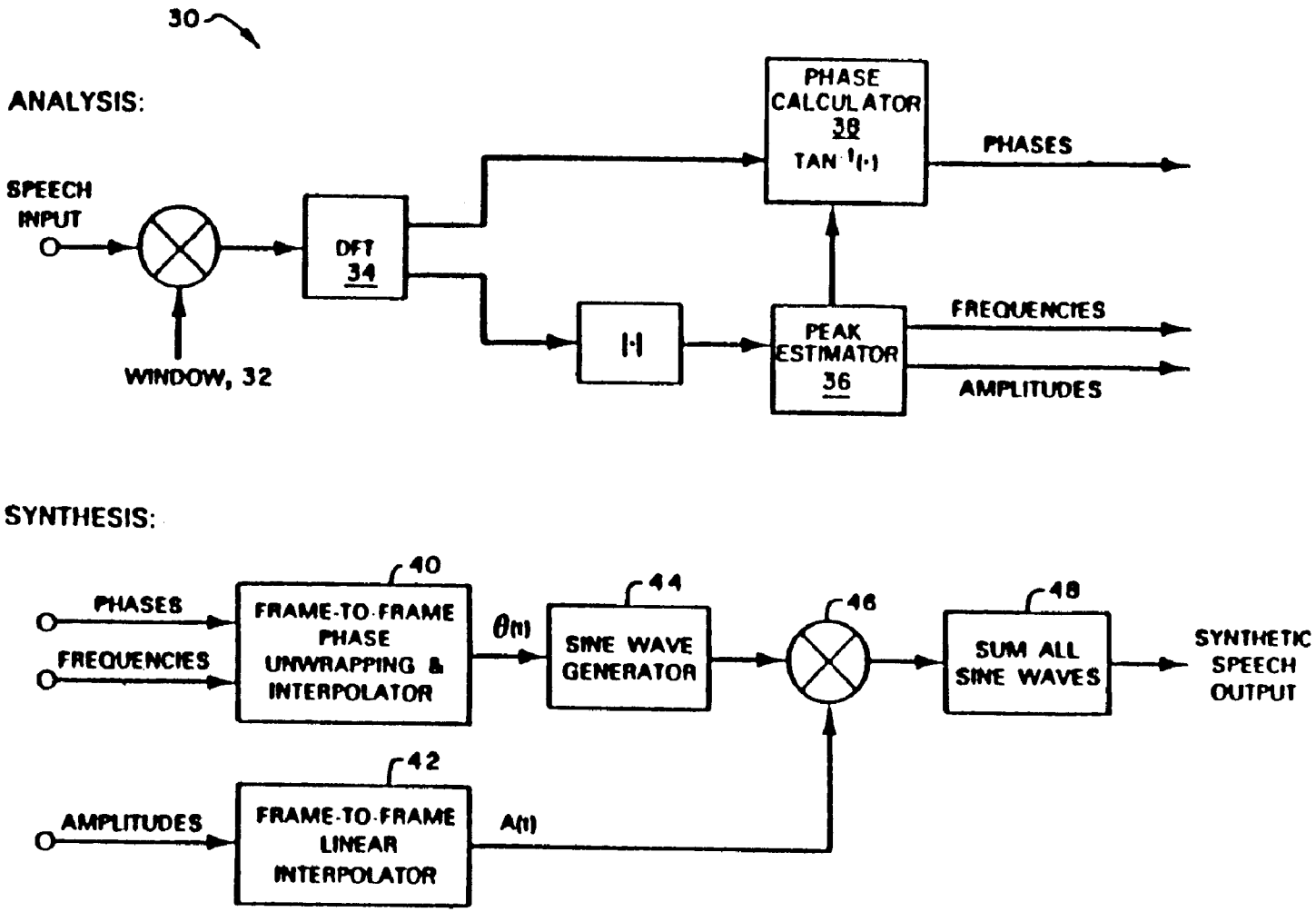
FIG. 6 is a schematic block diagram of another embodiment of the invention in which magnitude and phase of frequency components are used to reconstruct a sampled waveform.

FIG. 6 shows a block diagram of a more comprehensive system in which phases are measured directly. As shown in FIG. 6, the more comprehensive system 30 includes a sampling window 32, a discrete Fourier transform (DFT) analyzer 34, peak estimator 36, and phase calculator 38, in the analysis section, and a cubic phase interpolator 40, a linear amplitude interpolator 42, a sine wave generator 44, amplitude modulator 46 and summer 48 in the synthesis section. In this system the frequency components and their amplitudes are determined in the same manner as the magnitude-only system described above and illustrated in FIG. 1. Phase measurements, however, are derived directly from the discrete Fourier transform by computing the arctangents at the estimated frequency peaks.

Since in the comprehensive system of FIG. 6 a set of amplitudes, frequencies and phases are estimated for each frame, it might seem reasonable to estimate the original speech waveform on the k'th frame by generating synthetic speech using the equation, $$s(n) = \sum_{l=1}^{L(k)} A_l^k \cos[n\omega_l^k + \theta_l^k] \tag{7}$$

for $kN<n\leqq(k+1)N$. Due to the time-varying nature of the parameters, however, this straightforward approach leads to discontinuities at the frame boundaries which seriously degrades the quality of the synthetic speech. Therefore, a method must be found for smoothly interpolating the parameters measured from one frame to those that are obtained on the next.

As a result of the frequency matching algorithm described in the previous section, all of the parameters measured for an arbitrary frame k are associated with a corresponding set of parameters for frame k+1. Letting $[A_l^k, \omega_l^k, \theta_l^k]$ and $[A_l^{k+1}, \omega_l^{k+1}, \theta_l^{k+1}]$ denote the successive sets of parameters for the l'th frequency track, (21) then an obvious solution to the amplitude interpolation problem is to take $$A(n) = A^k + \frac{(A^{k+1} - A^k)}{N} n \tag{8}$$

where n=1,2, . . . , N is the time sample into the k'th frame. (The track subscript "l" has been omitted for convenience).

Unfortunately such a simple approach cannot be used to interpolate the frequency and phase because the measured phase, $\theta^k$, is obtained modulo 2 π. Hence, phase unwrapping must be performed to insure that the frequency tracks are "maximally smooth" across frame boundaries. The first step in solving this problem is to postulate a phase interpolation function that is a cubic polynomial, namely $$\theta(t)=\xi+\gamma t+\alpha t^2+\beta t^3 \tag{9}$$

It is convenient to treat the phase function as though it were a function of a continuous time variable t, with t=0 corresponding to frame k and t=T corresponding to frame k+1. The parameters of the polynomial must be chosen to satisfy the frequency and phase measurements obtained at the frame boundaries. Since the instantaneous frequency is the derivative of the phase, then $$\theta(t)=\gamma+2\alpha t+3\beta t^2 \tag{10}$$

and it follows that at the starting point, t=0, $$\theta(0)=\xi=\theta^k$$
$$\theta(0)=\gamma\omega^k \tag{11}$$

and at the terminal point, t=T $$\theta(T)=\theta^k+\omega^k T+\alpha T^2+\beta T^3=\theta^{k+1}+2\pi M$$
$$\theta(T)=\omega^k+2\alpha T+3\beta T^2=\omega^{k+1} \tag{12}$$

where again the track subscript "l" is omitted for convenience.

Since the terminal phase $\theta^{k+1}$ is measured modulo 2π, it is necessary to augment it by the term 2πM (M is an integer) in order to make the resulting frequency function "maximally smooth". At this point M is unknown, but for each value of M, whatever it may be, (12) can be solved for α(M) and β(B), (the dependence on M has now been made explicit). The solution is easily shown to satisfy the matrix equation:

$$\begin{bmatrix} \alpha(M) \\ \beta(M) \end{bmatrix} = \begin{bmatrix} \frac{3}{T^2} & \frac{-1}{T} \\ \frac{-2}{T^3} & \frac{1}{T^2} \end{bmatrix} \begin{bmatrix} \theta^{k+1} - \theta^k - \omega^k T + 2\pi M \\ \omega^{k+1} - \omega^k \end{bmatrix} \tag{13}$$

Figure 7:
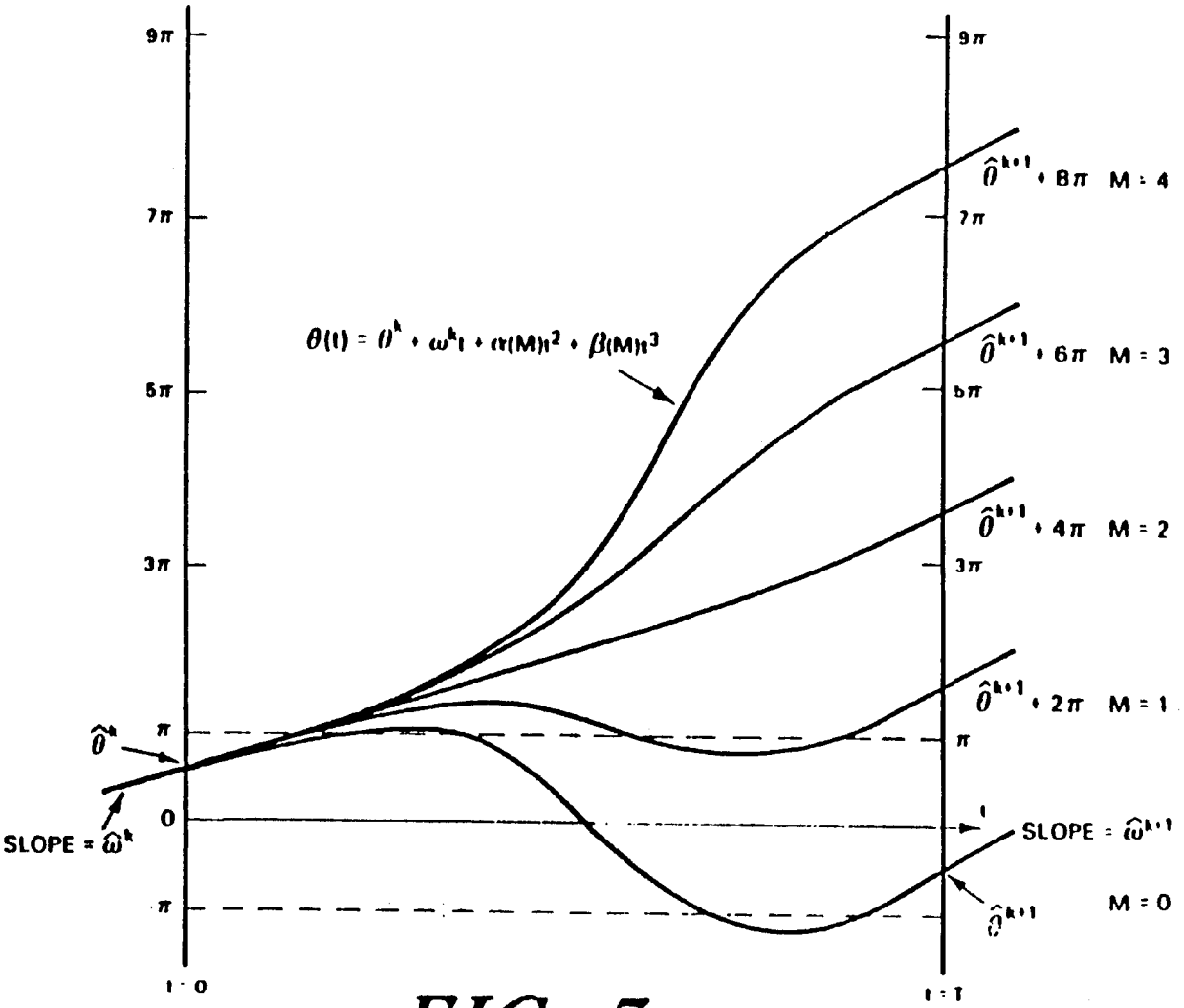
FIG. 7 is an illustrative set of cubic phase interpolation functions for smoothing the phase functions useful in connection with the embodiment of FIG. 6 from which the "maximally smooth" phase function is selected.

In order to determine M and ultimately the solution to the phase unwrapping problem, an additional constraint needs to be imposed that quantifies the "maximally smooth" criterion. FIG. 7 illustrates a typical set of cubic phase interpolation functions for a number of values of M. It seems clear on intuitive grounds that the best phase function to pick is the one that would have the least variation. This is what is meant by a maximally smooth frequency track. In fact, if the frequencies were constant and the vocal tract were stationary, the true phase would be linear. Therefore a reasonable criterion for "smoothness" is to choose M such that $$f(M)=\int_o^T[\theta(t;M)]^2dt \tag{14}$$

is a minimum, where $\theta(t;M)$ denotes second derivative of $\theta(t;M)$ with respect to the time variable t.

Although M is integer valued, since f(M) is quadratic in M, the problem is most easily solved by minimizing f(x) with respect to the continuous variable x and then choosing M to be the integer closest to x. After straightforward but tedious algebra, it can be shown that the minimizing value of x is $$x^* = \frac{1}{2\pi}\left[(\theta^k + \omega^k T - \theta^{k+1}) + (\omega^{k+1} - \omega^k)\frac{T}{2}\right] \tag{15}$$

from this $M^*$ is determined and used in (13) to compute $\alpha(M^*)$ and $\beta(M^*)$, and in turn, the unwrapped phase interpolation function $$\theta(t)=\theta^k+\omega^k t+\alpha(M^*)t^2+\beta(M^*)t^3 \tag{16}$$

This phase function not only satisfies all of the measured phase and frequency endpoint constraints, but also unwraps the phase in such a way that $\theta(t)$ is maximally smooth.

Since the above analysis began with the assumption of an initial unwrapped phase $\theta^k$ corresponding to frequency $\omega^k$ at the start of frame k, it is necessary to specify the initialization of the frame interpolation procedure. This is done by noting that at some point in time the track under study was born. When this event occurred, an amplitude, frequency and phase were measured at frame k+1 and the parameters at frame k to which these measurements correspond were defined by setting the amplitude to zero (i.e., $A^k=0$) while maintaining the same frequency (i.e., $\omega^k=\omega^{k+1}$). In order to insure that the phase interpolation constraints are satisfied initially, the unwrapped phase is defined to be the measured phase $\theta^{k+1}$ and the start-up phase is defined to be $$\theta^k=\theta^{k+1}-\omega^{k+1}N \tag{17}$$

where N is the number of samples traversed in going from frame k+1 back to frame k.

As a result of the above phase unwrapping procedure, each frequency track will have associated with it an instantaneous unwrapped phase which accounts for both the rapid phase changes due to the frequency of each sinusoidal component, and the slowly varying phase changes due to the glottal pulse and the vocal track transfer function. Letting $\theta_l(t)$ denote the unwrapped phase function for the l'th track, then the final synthetic waveform will be given by $$s(n) = \sum_{l=1}^{L(k)} A_l(n)\cos[\theta_l(n)] \tag{18}$$

where $kN<n\leqq(k+1)N$, $A_l(n)$ is given by (8), $\theta_l(n)$ is the sampled data version of (16), the $L^{(k)}$ is the number of sine waves estimated for the k'th frame.

The invention as described in connection with FIG. 6 has been used to develop a speech coding system for operation at 8 kilobits per second. At this rate, high-quality speech depends critically on the phase measurements and, thus, phase coding is a high priority. Since the sinusoidal representation also requires the specification of the amplitudes and frequencies, it is clear that relatively few peaks can be coded before all of the available bits were used. The first step, therefore, is to significantly reduce the number of parameters that must be coded. One way to do this is to force all of the frequencies to be harmonic.

During voiced speech one would expect all of the peaks to be harmonically related and therefore, by coding the fundamental, the locations of all of the frequencies will be available at the receiver. During unvoiced speech the frequency locations of the peaks will not be harmonic in this case. However, it is well known from random process theory that noise-like waveforms can be represented (in an ensemble mean-squared error sense) in terms of a harmonic expansion of sine waves provided the spacing between adjacent harmonics is small enough that there is little change in the power spectrum envelope (i.e. intervals less than about 100 Hz). This representation preserves the statistical properties of the input speech provided the amplitudes and phases are randomly varying from frame to frame. Since the amplitudes and phases are to be coded, this random variation inherent in the measurement variables can be preserved in the synthetic waveform.

As a practical matter it is preferable to estimate the fundamental frequency that characterizes the set of frequencies in each frame, which in turn relates to pitch extraction. For example, pitch extraction can be accomplished by selecting the fundamental frequency of a harmonic set of sine waves to produce the best fit to the input waveform according to a perceptual criterion. Other pitch extraction techniques can also be employed.

As an immediate consequence of using the harmonic frequency model, it follows that the number of sine wave components to be coded is the bandwidth of the coded speech divided by the fundamental. Since there is no guarantee that the number of measured peaks will equal this harmonic number, provision should be made for adjusting the number of peaks to be coded. Based on the fundamental, a set of harmonic frequency bins are established and the number of peaks falling within each bin are examined. If more than one peak is found, then only the amplitude and phase corresponding to the largest peak are retained for coding. If there are no peaks in a given bin, then an artificial peak is created having an amplitude and phase obtained by sampling the short-time Fourier Transform at the frequency corresponding to the center of the bin.

The amplitudes are then coded by applying the same techniques used in channel vocoders. That is, a gain level is set, for example, by using 5 bits with 2 dB per level to code the amplitude of a first peak (i.e. the first peak above 300 Hz). Subsequent peaks are coded logarithmically using delta-modulation techniques across frequency. In one simulation 3.6 kbps were assigned to code the amplitudes at a 50 Hz frame rate. Adaptive bit allocation rules can be used to assign bits to peaks. For example, if the pitch is high there will be relatively few peaks to code, and there will be more bits per peak. Conversely when the pitch is low there will be relatively few bits per peak, but since the peaks will be closer together their values will be more correlated, hence the ADPCM coder should be able to track them well.

To code the phases a fixed number of bits per peak (typically 4 or 5) is used. One method for coding the phases is to assign the measured phase to one of $2^n$ equal subdivisions of $-\pi$ to $\pi$ region, where n=4 or 5. Another method uses the frequency track corresponding to the phase (to be coded) to predict the phase at the end of the current frame, unwrap the value, and then code the phase residual using ADPCM techniques with 4 or 5 bits per phase peak. Since there remains only 4.4 kbps to code the phases and the fundamental (7 bits are used), then at a 50 Hz frame rate, it will be possible to code at most 16 peaks. At a 4 kHz speech bandwidth and four bits per phase, all of the phases will be coded provided the pitch is greater than 250 Hz. If the pitch is less than 250 Hz provision has to be made for regenerating a phase track for the uncoded high frequency peaks. This is done by computing a differential frequency that is the difference between the derivative of the instantaneous cubic phase and the linear interpolation of the end point frequencies for that track. The differential frequency is translated to the high frequency region by adding it to the linear interpolation of the end point frequencies corresponding to the track of the uncoded phase. The resulting instantaneous frequency function is then integrated to give the instantaneous phase function that is applied to the sine wave generator. In this way the phase coherence intrinsic in the voiced speech and the phase incoherence characteristic of unvoiced speech is effectively translated to the uncoded frequency regions.

Figure 8:
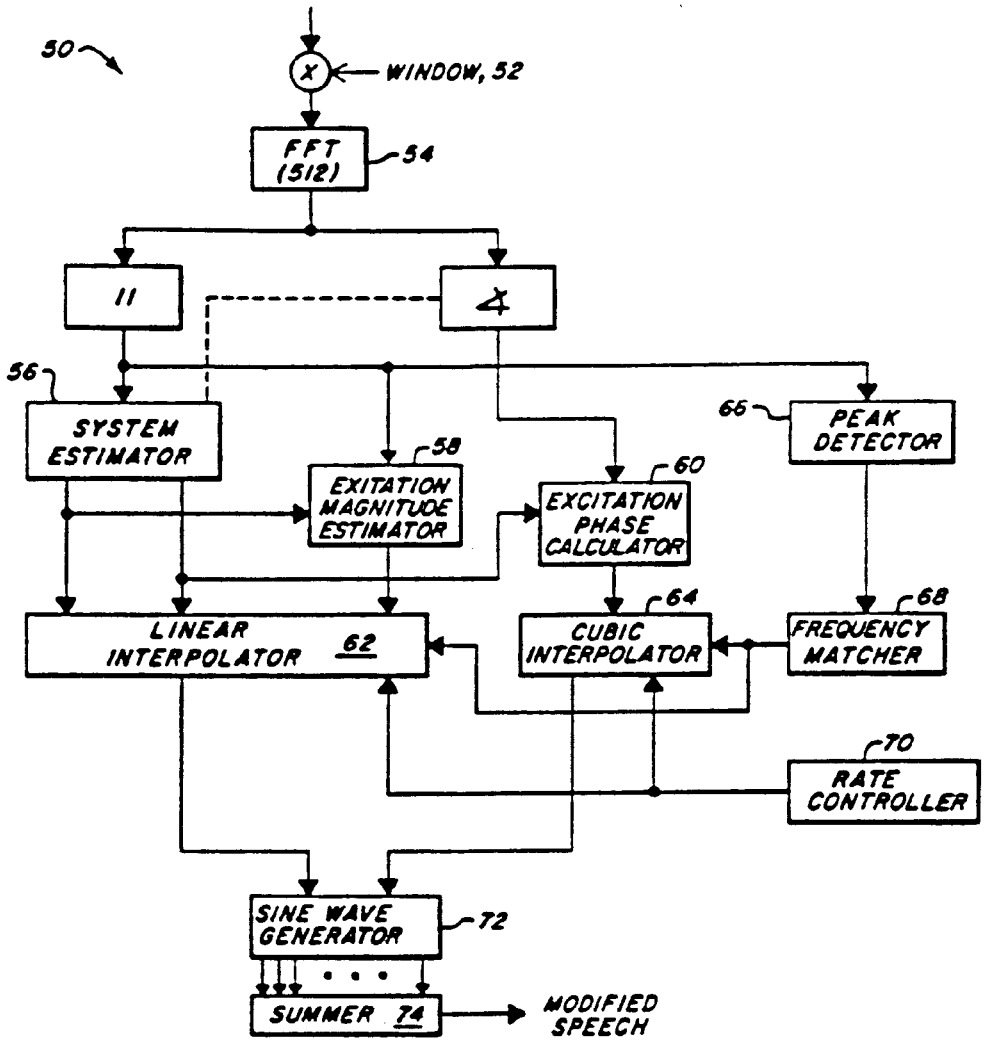
FIG. 8 is a schematic block diagram of another embodiment of the invention particularly useful for time-scale modification.

In FIG. 8 another embodiment of the invention is shown, particularly adapted for time-scale modification. As shown in FIG. 8, the time-scale modification system 50 includes a sampling window 52, a fast Fourier system 50 includes a sampling window 52, a fast Fourier transform (FFT) analyzer 54, a system contribution estimator 56, an excitation magnitude estimator 58, an excitation phase calculator 60, a linear interpolator 62 (for interpolating the system "magnitudes" and "phases", as well as the excitation "magnitudes" of the spectral components from frame-to-frame), and a cubic interpolator 64 (for interpolating the excitation phase values from frame-to-frame). The system 50 also includes a peak detector 68 and frequency matcher 68 which control the interpolators 62 and 64 in a manner analogous to the techniques discussed above in connection with the other embodiments.

Time-scale modification is achieved by rate controller 70 which provides adjustments to the rate of interpolation in interpolators 62 and 64 to slow down or speed up the processing of the waveforms. The modified waveforms are then synthesized by sine wave generator 72 and summer 74. In this illustration, the representative sine waves are further defined to consist of system contributions (i.e. from the vocal tract) and excitation contributions (i.e. from the vocal chords). The excitation phase contributions are singled out for cubic interpolation. The procedure generally follows that described above in connection with other embodiments; however, in a further step the measured amplitudes $A_l^k$ and phases $\theta_l^k$ are decomposed into vocal tract and excitation components. The approach is to first form estimates of the vocal tract amplitude and phase as functions of frequency at each analysis frame (i.e., M(ω, kR) and Φ(ω, kR)). System amplitude and phase estimates at the selected frequencies $\omega_l^k$ are then given by:

$$M_l^k = M(\omega_l^k, kR) \tag{19}$$

and $$\Phi_l^k = (\omega_l^k, kR) \tag{20}$$

Finally, the excitation parameter estimates at each analysis frame boundary are obtained as $$\alpha_l^k = A_l^k / M_l^k \tag{21}$$

and $$\Omega_l^k = \theta_l^k - \Phi_l^k \tag{22}$$

The decomposition problem then becomes that of estimating M(ω, kR) and Φ(ω, kR) as functions of frequency from the high resolution spectrum X(ω,kR). (In practice, of course, uniformly spaced frequency samples are available from the DFT.) There exist a number of established ways for separating out the system magnitude from the high-resolution spectrum, such as all-pole modeling and homomorphic deconvolution. If the vocal tract transfer function is assumed to be minimum phase then the logarithm of the system magnitude and the system phase form a Hilbert transform pair. Under this condition, a phase estimate Φ(ω, kR) can be derived from the logarithm of a magnitude estimate M(ω,kR) of the system function through the Hilbert transform. Furthermore, the resulting phase estimate will be smooth and unwrapped as a function of frequency.

Figure 9:
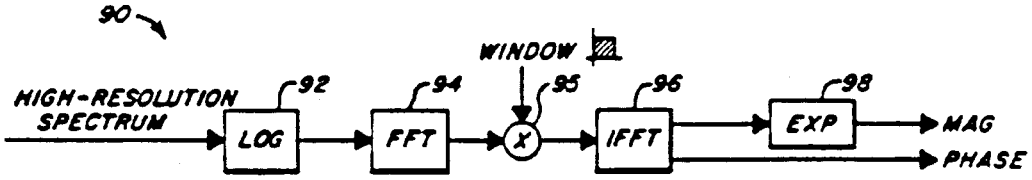
FIG. 9 is a schematic block diagram showing an embodiment of the system estimation function of FIG. 8.

One approach to estimation of the system magnitude, and the corresponding estimation of the system phase through the use of the Hilbert Transform is shown in FIG. 9 and is based on a homomorphic transformation. In FIG. 9, a homomorphic analysis system 90 is shown consisting of a logarithmic operator 92, a fast Fourier transform (FFT) calculator 94, a right-sided window 95, an inverse FFT calculator 96 and an exponential operator 98. In this technique, the separation of the system amplitude from the high-resolution spectrum and the computation of the Hilbert transform of this amplitude estimate are in effect performed simultaneously. The Fourier transform of the logarithm of the high-resolution magnitude is first computed to obtain the "cepstrum". A right-sided window, with duration proportional to the average pitch period, is then applied. The imaginary component of the resulting inverse Fourier transform is the desired phase and the real part is the smooth log-magnitude. In practice, uniformly spaced samples of the Fourier transform are computed with the FFT. The length of the FFT was chosen at 512 which was sufficiently large to avoid aliasing in the cepstrum. Thus, the high-resolution spectrum used to estimate the sinewave frequencies is also used to estimate the vocal-tract system function.

The remaining analysis steps in the time-scale modifying system of FIG. 8 are analogous to those described above in connection with the other embodiments. As a result of the matching algorithm, all of the amplitudes and phases of the excitation and system components measured for an arbitrary frame k are associated with a corresponding set of parameters for frame k+1. The next step in the synthesis is to interpolate the matched excitation and system parameters across frame boundaries. The interpolation procedures are based on the assumption that the excitation and system functions are slowly-varying across frame boundaries. This is consistent with the assumption that the model parameters are slowly-varying relative to the duration of the vocal tract impulse response. Since this slowly-varying constraint maps to a slowly-varying excitation and system amplitude, it suffices to interpolate these functions linearly.

Since the vocal tract system is assumed slowly-varying over consecutive frames, it is reasonable to assume that its phase is slowly-varying as well as thus linear interpolation of the phase samples will also suffice. However, the characteristic of "slowly-varying" is more difficult to achieve for the system phase than for the system magnitude. This is because an additional constraint must be imposed on the measured phase; namely that the phase be smooth and unwrapped as a function of frequency at each frame boundary. There it is shown that if the system phase is obtained module $2\pi$ then linear interpolation can result in a (falsely) rapidly-varying system phase between frame boundaies. The importance of the use of a homomorphic analyser of FIG. 9 is now evident. The system phase estimate derived from the homomorphic analysis is unwrapped in frequency and thus slowly-varying when the system amplitude (from which it was derived) is slowly-varying. Linear interpolation of samples of this function results then in a phase trajectory which reflects the underlying vocal tract movement. This phase function is referred to as $\Phi_l(t)$ where $\Phi_l(o)$ corresponds to the $\Phi_l^k$ of Equation 22. Finally, as before, a cubic polynomial is employed to interpolate the excitation phase and frequency. This will be referred to $\Omega_l(t)$ where $\Omega_l(o)$ corresponds to $\Omega_l^k$ of Equation 22.

The goal of time-scale modification is to maintain the perceptual quality of the original speech while changing the apparent rate of articulation. This implies that the frequency trajectories of the excitation (and thus the pitch contour) are stretched or compressed in time and the vocal tract changes at a slower or faster rate. The synthesis method of the previous section is ideally suited for this transformation since it involves summing sine waves composed of vocal cord excitation and vocal tract system contributions for which explicit functional expressions have been derived.

Speech events which take place at a time $t_o$ according to the new time scale will have occured at $\rho^{-1}t_o$ in the original time scale. To apply the above sine wave model to time-scale modification, the "events" which are time-scaled are the system amplitudes and phases, and the excitation amplitudes and frequencies, along each frequency track. Since the parameter estimates of the unmodified synthesis are available as continuous functions of time, then in theory, any rate change is possible. In conjunction with the Equations (19)–(22) the time scaled synthetic waveform can be expressed as:

$$S\cdot(n)=\sum_{l=1}^{L(n)} A_l(p^{-1}n)\cos[\Omega_l(p^{-1}n)/p^{-1}+\Phi_l(p^{-1}n] \tag{23}$$

where L (n) is the number of sine waves estimated at time n. The required values in equation (23) are obtained by simply scaling $A_l(t)$, $\Omega_l(t)$ and $\Phi_l(t)$ at a time $\rho^{-1}n$ and scaling the resulting excitation phase by $\rho^{-1}$.

With the proposed time-scale modification system, it is also straightforward to apply a time-varying rate change. Here the time-warping transformation is given by $$t_o=W(t_o')=\int_o^{t_o'}\rho(T)dT \tag{24}$$

where $\rho(T)$ is the desired time-varying rate change. In this generalization, each time-differential dT is scaled by a different factor $\rho(T)$. Speech events which take place at a time $t_o$ in the new time scale will now occur at a time $t_o'=W^{-1}(t_o)$ in the original time scale. If $t_o$ maps back to $t_o'$, then one approximation is given by:

$$t_1'\cong t_o'+\rho^{-1}(t_o') \tag{25}$$

Since the parameters of the sinusoidal components are available as continuous functions of time, they can always be found at the required $t_1'$.

Letting $t_n'$ denote the inverse to time $t_n$=n, the synthetic waveform is then given by:

$$s'(n)=\Sigma_{l=1}^{L(n)}A_l(t_n')\cos[\Omega_l'(t_n')+\Phi_l(t_n')] \tag{26}$$

where $$\Omega_l'(n)=\Omega_l'(n-1)+\omega_l(t_n') \tag{27}$$

and $$t_n'=t_{n-1}'+\rho^{-1}(t_{n-1}') \tag{28}$$

where $\omega_l(t)$ is a quadratic function given by the first derivative of the cubic phase function $\Omega_l(t)$.

And where $$t_o'=0 \tag{29}$$

At the time a particular track is born, the cubic phase function $\Omega_l'(n)$ is initialized by the value $\rho(t_n')\Omega_l(t_n')$ where $\Omega_l(t_n')$ is the initial excitation phase obtained using (17).

It should also be appreciated that the invention can be used to perform frequency and pitch scaling. The short time spectral envelope of the synthetic waveform can be varied by scaling each frequency component and the pitch of the synthetic waveform can be altered by scaling the excitation-contributed frequency components.

Figure 10:
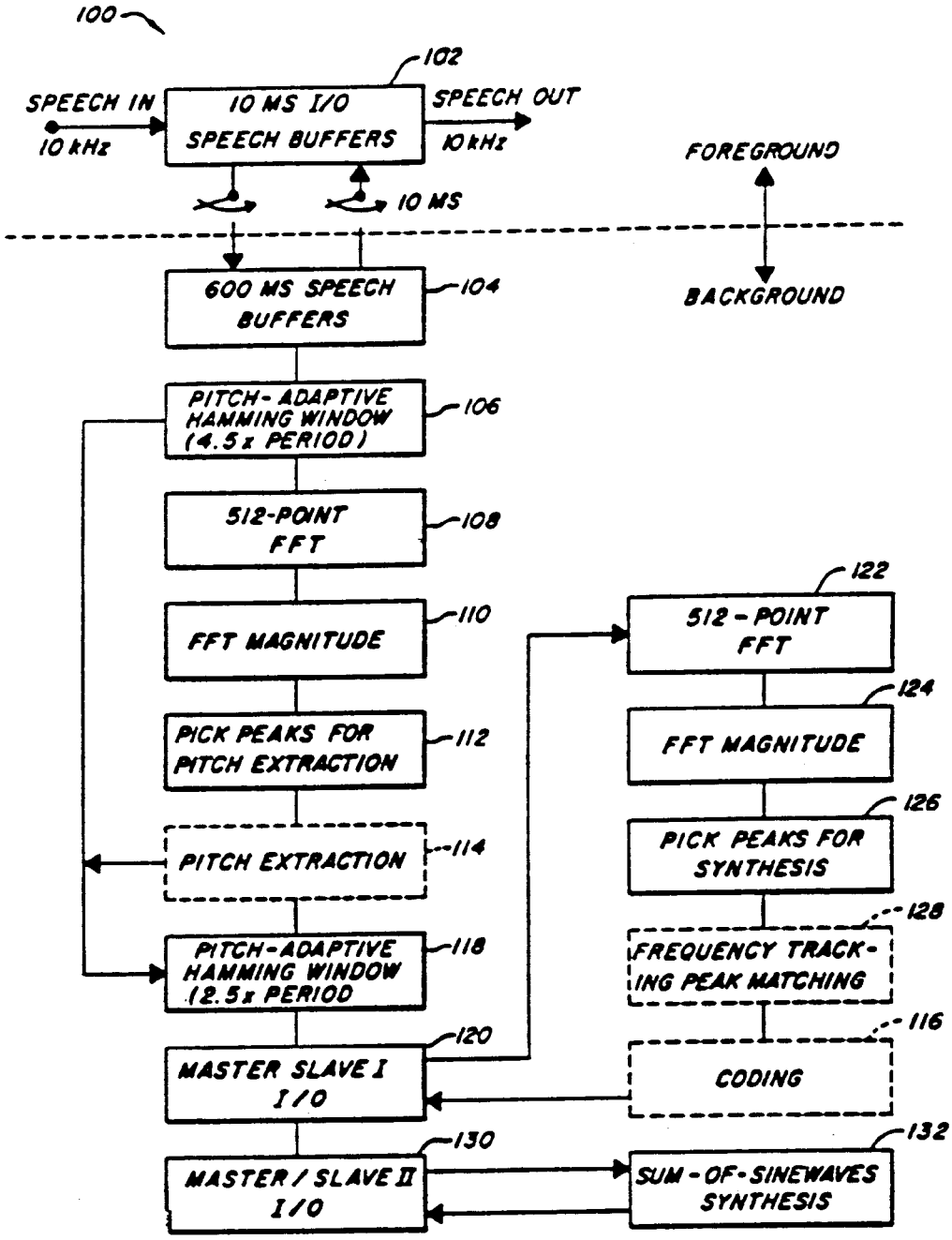
FIG. 10 is a block diagram of one real-time implementation of the invention.

In FIG. 10 a final embodiment 100 of the invention is shown which has been implemented and operated in real time. The illustrated embodiment was implemented in 16-bit fixed point arithmetic using four Lincoln Digital Signal Processor (LDSPs). The foreground program operates on every input A/D sample collecting 100 input speech samples into 10 msec buffers 102. At the same time a 10 msec buffer of synthesized speech is played out through a D/A converter. At the end of each frame, the most recent speech is pushed down into a 600 msec buffer 104. It is from this buffer that the data for the pitch-adaptive Hamming window 106 is drawn and on which a 512 point Fast Fourier Transform (FFT) is applied by FFt calucoator 108. Next a set of amplitudes and frequencies is obtained magnitude estimator 110 and peak detector 112 by locating the peaks of the magnitude of the FFT. The data is supplied to the pitch extraction module 114 from which is generated the pitch estimate that controls the pitch-adaptive windows. This parameter is also supplied to the coding module 116 in the data compression application. Once the pitch has been estimated another pitch adaptive Hamming window 118 is buffered and the data transferred by I/O operator 120 to another LDSP for parallel computation. Another 512 point FFT is taken by FFT calculator 122 for the purpose of estimating the amplitudes, frequencies and phases, to which the coding and speech modification methods will be applied. Once these peaks have been determined the frequency tracking and phase interpolation methods are implemented. Depending upon the application, these parameters would be coded by coder 116 or modified to effect a speech transformation and transferred to another pair of LDSPs, where the sum of sine waves synthesis is implemented. The resulting synthetic waveform is then transferred back to the master LDSP where it is put into the appropriate buffer to be accessed by the foreground program for D/A output.

We claim:

1. A method of processing an acoustic waveform, the method comprising:

sampling the waveform to obtain a series of discrete samples and constructing therefrom a series of frames, each frame spanning a plurality of samples;

analyzing each frame of samples to extract a set of variable frequency components having individual amplitudes;

matching said variable components from one frame to a next frame such that a component in one frame is matched with a component in a successive frame that has a similar value regardless of shifts in frequency and spectral energy; and interpolating the matched values of the components from the one frame to the next frame to obtain a parametric representation of the waveform whereby a synthetic waveform can be constructed by generating a set of sine waves corresponding to the interpolated values of the parametric representation.

2. The method of claim 1 wherein the step of sampling further includes determining a pitch period for said waveform and varying the length of the frame in accordance with the pitch period, the length being at least twice the pitch period of the waveform.

3. The method of claim 2 wherein the step of sampling further includes sampling the waveform according to a pitch-adaptive Hamming window.

4. The method of claim 1 wherein the step of analyzing further includes analyzing each frame by Fourier analysis.

5. The method of claim 1 wherein the step of analyzing further includes selecting a harmonic series to approximate the frequency components.

6. The method of claim 5 wherein the step of selecting a harmonic series further includes determining a pitch period for the waveform and varying the number of frequency components in the harmonic series in accordance with the pitch period of the waveform.

7. The method of claim 1 wherein the step of matching includes matching a frequency component of nonzero amplitude from the one frame with a frequency component of nonzero amplitude in the next frame having a similar frequency value.

8. The method of claim 7 wherein said matching further provides for the birth of new frequency components and the death of old frequency components.

9. The method of claim 1 wherein the step of interpolating values further includes defining a series of instantaneous frequency values by interpolating matched frequency components from the one frame to the next frame and then integrating the series of instantaneous frequency values to obtain a series of interpolated phase values.

10. The method of claim 1 wherein the step of interpolating further includes deriving phase values from frequency and phase measurements taken at each frame and then interpolating the phase measurements.

11. The method of claim 1 wherein the step of interpolating is achieved by performing an overlap and add function.

12. The method of claim 1 wherein the method further includes coding the frequency components for digital transmission.

13. The method of claim 12 wherein the frequency components are limited to a predetermined number defined by a plurality of harmonic frequency bins.

14. The method of claim 13 wherein the amplitude of only one of said components is coded for gain and the amplitudes of the others are coded relative to the neighboring component at the next lowest frequency.

15. The method of claim 12 wherein the phases are coded by applying pulse code modulation techniques to a predicted phase residual.

16. The method of claim 12 wherein high frequency regeneration is applied.

17. The method of claim 1 wherein the method further comprises constructing a synthetic waveform by generating a series of constituent sine waves corresponding in frequency and amplitude to the extracted components.

18. The method of claim 17 wherein the time-scale of said reconstructed waveform is varied by changing the rate at which said series of constituent sine waves are interpolated.

19. The method of claim 18 wherein the time-scale is continuously variable over a defined range.

20. The method of claim 17 wherein the pitch of the synthetic waveform is varied by adjusting the frequency of each frequency component while maintaining the overall spectral envelope.

21. The method of claim 1 wherein the method further comprises constructing a synthetic waveform by generating a series of constituent sine waves corresponding in frequency, amplitude, and phase to the extracted components.

22. The method of claim 21 wherein the time-scale of said reconstructed waveform is varied by changing the rate at which said series of constituent sine waves are interpolated.

23. The method of claim 22 wherein the time-scale is continuously variable over a defined range.

24. The device of claim 22 wherein the device further comprises means for constructing a synthetic waveform by generating a series of constituent sine waves corresponding in frequency and amplitude to the extracted components.

25. The device of claim 24 wherein the device further includes means for varying the time-scale of said reconstructed waveform by changing the rate at which said series of constituent sine waves are interpolated.

26. The device of claim 25 wherein the means for varying the time-scale is continuously variable over a defined range.

27. The device of claim 24 wherein the constituent sine waves are further defined by system contributions and excitation contributions and wherein the means for varying the time-scale of said reconstructed waveform further includes means for changing the rate at which parameters defining the system contributions of the sine waves are interpolated.

28. The device of claim 27 wherein the device further includes a scaling means for scaling the frequency components.

29. The device of claim 27 wherein the device further includes a scaling-means for scaling the excitation-contributed frequency components.

30. The method of claim 21 wherein the constituent sine waves are further defined by system contributions and excitation contributions and wherein the time-scale of said reconstructed waveform is varied by changing the rate at which parameters defining the system contributions of the sine waves are interpolated.

31. The method of claim 30 wherein the pitch of the synthetic waveform is altered by adjusting the frequencies of the excitation-contributed frequency components while maintaining the overall spectral envelope.

32. A device for processing an acoustic waveform, the device comprising:

sampling means for sampling the waveform to obtain a series of discrete samples and constructing therefrom a series of frames, each frame spanning a plurality of samples;

analyzing means for analyzing each frame of samples to extract a set of variable frequency components having individual amplitudes;

matching means for matching said variable components from one frame to a next frame such that a component in one frame is matched with a component in a successive frame that has a similar value regardless of shifts in frequency and spectral energy; and interpolating means for interpolating the matched values of the components from the one frame to the next frame to obtain a parametric representation of the waveform whereby a synthetic waveform can be constructed by generating a set of sine waves corresponding to the interpolated values of the parametric representation.

33. The device of claim 32 wherein the sampling means further includes means for constructing a frame having variable length, which varies in accordance with the pitch period, the length being at least twice the pitch period of the waveform.

34. The device of claim 32 wherein the sampling means further includes means for sampling according to a Hamming window.

35. The device of claim 32 wherein analyzing means further includes means for analyzing each frame by Fourier analysis.

36. The device of claim 32 wherein the analyzing means further includes means for selecting a harmonic series to approximate the frequency components.

37. The device of claim 36 wherein the number of frequency components in the harmonic series varies according to the pitch period of the waveform.

38. The device of claim 32 wherein the matching means includes means for matching a frequency component of nonzero amplitude from the one frame with a frequency component of nonzero amplitude in the next frame having a similar frequency value.

39. The device of claim 38 wherein said matching means further provides for the birth of new frequency components and the death of old frequency components.

40. The device of claim 38 wherein the frequency components are limited to a predetermined number defined by a plurality of harmonic frequency bins.

41. The device of claim 40 wherein the amplitude of only one of said components is coded for gain and the amplitudes of the others are coded relative to the neighboring component at the next lowest frequency.

42. The device of claim 32 wherein the interpolating means further includes means defining a series of instantaneous frequency values by interpolating matched frequency components from the one frame to the next frame and means for integrating the series of instantaneous frequency values to obtain a series of interpolated phase values.

43. The device of claim 32 wherein the interpolating means further includes means for deriving phase values from the frequency and phase measurements taken at each frame and then interpolating the phase measurements.

44. The device of claim 32 wherein the interpolating means further includes means for performing an overlap and add function.

45. The device of claim 32 wherein the device further includes coding means for coding the frequency components for digital transmission.

46. The device of claim 45 wherein the coding means further comprises means for applying pulse code modulation techniques to a predicted phase residual.

47. The device of claim 45 wherein the coding means further comprises means for generating high frequency components.

48. The device of claim 32 wherein the device further comprises means for constructing a synthetic waveform by generating a series of constituent sine waves corresponding in frequency, amplitude, and phase to the extracted components.

49. The device of claim 48 wherein the device further includes means for varying the time-scale of said reconstructed waveform by changing the rate at which said series of constituent sine waves are interpolated.

50. The device of claim 49 wherein the means for varying the time-scale is continuously variable over a defined range.

51. A coded speech transmission system comprising:

sampling means for sampling a speech waveform to obtain a series of discrete samples and for constructing therefrom a series of frames, each frame spanning a plurality of samples;

analyzing means for analyzing each frame of samples by Fourier analysis to extract a set of variable frequency components having individual amplitude values;

coding means for coding the component values;

decoding means for decoding the coded values after transmission and for reconstituting the variable components;

matching means for matching the reconstituted, variable components from one frame to a next frame such that a component in one frame is matched with a component in a successive frame that has a similar value regardless of shift in frequency and spectral energy; and interpolation means for interpolating the values of the frequency components from the one frame to the next frame to obtain a representation of the waveform whereby synthetic speech can be constructed by generating a set of sine waves corresponding to the interpolated values of the parametric representation.

52. The device of claim 51 wherein the coding means further includes means for selecting a harmonic series of bins to approximate the frequency components and the number of bins varies according to the pitch of the waveform.

53. The device of claim 51 wherein the amplitude of only one of said components is coded for gain and the amplitudes of the other components are coded relative to the neighboring component at the next lowest frequency.

54. The device of claim 51 wherein the amplitudes of the components are coded by linear prediction techniques.

55. The device of claim 51 wherein the amplitudes of the components are coded by adaptive delta modulation techniques.

56. The device of claim 51 wherein the analyzing means further comprises means for measuring phase values for each frequency component.

57. The device of claim 56 wherein the coding means further includes means for coding the phase values by applying pulse code modulations to a predicted phase residual.

58. A device for altering the time-scale of an audible waveform, the device comprising:

sampling means for sampling the waveform to obtain a series of discrete samples and for constructing therefrom a series of frames, each frame spanning a plurality of samples;

analyzing means for analyzing each frame of samples to extract a set of variable frequency components having individual amplitudes;

matching means for matching said variable components from one frame to a next frame such that a component in one frame is matched with a component in a successive frame that has a similar value regardless of shifts in frequency and spectral energy;

interpolating means for interpolating the amplitude and frequency values of the components from the one frame to the next frame to obtain a representation of the waveform whereby a synthetic waveform can be constructed by generating a set of sine waves corresponding to the interpolated representation;

interpolation rate adjusting means for altering the rate of interpolation; and synthesizing means for constructing a time-scaled synthetic waveform by generating a series of constituent sine waves corresponding in frequency and amplitude to the extracted components, the sine waves being generated at said alterable interpolation rate.

59. The device of claim 58 wherein the interpolation rate adjusting means is continuously variable over a defined range.

60. The device of claim 58 wherein the analyzing means further comprises means for measuring phase values for each frequency component.

61. The device of claim 60 wherein the component phase values are interpolated by cubic interpolation.

62. The device of claim 60 wherein the interpolation rate adjusting means is continuously variable over a defined range and further includes means for adjusting the rate of phase value interpolations.

63. The device of claim 60 wherein the device further comprises means for separating the measured frequency components into system contributions and excitation contributions and wherein the interpolation rate adjusting means varies the time-scale of the synthetic waveform by altering the rate at which values defining the system contributions are interpolated.

64. The device of claim 63 wherein the interpolation rate adjusting means alters the rate at which the system amplitudes and phases and the excitation amplitudes and frequencies are interpolated.

65. The method of claim 1 wherein the step of matching provides for the birth of new frequency components and the death of old frequency components.

66. The method of claim 65 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

67. The method of claim 66 wherein the acoustic waveform is speech and, in voiced speech, the frequency components approximate harmonics to pitch frequency.

68. The method of claim 65 wherein the acoustic waveform is speech and, in voiced speech, the frequency components approximate harmonics to pitch frequency.

69. The method of claim 1 wherein the step of analyzing comprises identifying the frequency components by peak picking.

70. The method of claim 69 wherein the step of matching provides for the birth of new frequency components and the death of old frequency components.

71. The method of claim 70 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

72. The method of claim 71 wherein the acoustic waveform is speech and, in voiced speech, the frequency components approximate harmonics to pitch frequency.

73. The method of claim 1 wherein the acoustic waveform is speech and, in voiced speech, the frequency components approximate harmonics to pitch frequency.

74. The device of claim 32 wherein the matching means provides for the birth of new frequency components and the death of old frequency components.

75. The device of claim 74 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

76. The device of claim 75 wherein the acoustic waveform is speech and, in voiced speech, the frequency components approximate harmonics to pitch frequency.

77. The device of claim 74 wherein the acoustic waveform is speech and, in voiced speech, the frequency components approximate harmonics to pitch frequency.

78. The device of claim 32 wherein the analyzing means identifies the frequency components by peak picking.

79. The device of claim 78 wherein the matching means provides for the birth of new frequency components and the death of old frequency components.

80. The device of claim 79 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

81. The device of claim 80 wherein the acoustic waveform is speech and, in voiced speech, the frequency components approximate harmonics to pitch frequency.

82. The device of claim 32 wherein the acoustic waveform is speech and, in voiced speech, the frequency components approximate harmonics to pitch frequency.

83. The system of claim 51 wherein the matching means provides for the birth of new frequency components and the death of old frequency components.

84. The system of claim 83 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

85. The system of claim 51 wherein the analyzing means identifies the frequency components by peak picking.

86. The system of claim 85 wherein the matching means provides for the birth of new frequency components and the death of old frequency components.

87. The system of claim 86 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

88. The device of claim 58 wherein the matching means provides for the birth of new frequency components and the death of old frequency components.

89. The device of claim 88 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

90. The device of claim 58 wherein the analyzing means identifies the frequency components by peak picking.

91. The device of claim 90 wherein the matching means provides for the birth of new frequency components and the death of old frequency components.

92. The device of claim 91 wherein the birth of a new frequency component establishes a component of zero magnitude in the one frame at the same frequency as a component of the successive frame and the death of an old frequency component establishes a component of zero magnitude in the successive frame at the same frequency as a component of the one frame.

93. The method of claim 1 wherein the step of interpolating comprises interpolating utilizes a phase interpolation function that is smooth in unwrapping the phase to a phase which, modulo $2\pi$, achieves the phase of the extracted variable frequency components at frame boundaries.

94. The device of claim 32 wherein the interpolating means utilizes a phase interpolation function that is smooth in unwrapping the phase to a phase which, module $2\pi$, achieves the phase of the extracted variable frequency components at frame boundaries.

95. The system of claim 51 wherein the interpolating means utilizes a phase interpolation function that is smooth in unwrapping the phase to a phase which, module $2\pi$, achieves the phase of the extracted variable frequency components at frame boundaries.

96. The device of claim 58 wherein the interpolating means utilizes a phase interpolation function that is smooth in unwrapping the phase to a phase which, module $2\pi$, achieves the phase of the extracted variable frequency components at frame boundaries.

* * * * *

UNITED STATES PATENT AND TRADEMARK OFFICE

CERTIFICATE OF CORRECTION

PATENT NO. : Re. 36,478

DATED : December 28, 1999

INVENTOR(S) : Robert J. McAulay and Thomas F. Quatieri, Jr.

It is certified that error appears in the above-identified patent and that said Letters Patent is hereby corrected as shown below:

In claim 29, column 16, line 64, change "scaling-means" to ---scaling means---.

In claim 41, column 17, line 59, change "at" to ---of---.

In claim 58, column 19, line 4, delete "for."

In claim 93, column 22, line 5, change "utilizes" to ---utilizing---.

In claim 94, column 22, line 11, change "module" to ---modulo---.

In claim 95, column 22, line 16, change "module" to ---modulo---.

In claim 96, column 22, line 22, change "module" to ---modulo---.

Signed and Sealed this

Fifth Day of September, 2000

*Attest:*

*Attesting Officer*

Q. TODD DICKINSON

*Director of Patents and Trademarks*